United States Patent

Buvelot

[15] 3,642,045
[45] Feb. 15, 1972

[54] CHEESE-GRATING DEVICE

[72] Inventor: Jacques Buvelot, Chemin Vegrassat 12, 1180 Rolle, Switzerland

[22] Filed: Sept. 23, 1969

[21] Appl. No.: 860,238

[30] Foreign Application Priority Data

Oct. 5, 1968 Switzerland ....................... 472241/68

[52] U.S. Cl. .............................................. 146/60, 146/177
[51] Int. Cl. ..................................... A47j 43/28, B02c 18/00
[58] Field of Search ............................................ 146/177, 60

[56] References Cited

UNITED STATES PATENTS 824,768  7/1906  Welch ...................................... 146/60

1,970,492  8/1934  Crankshaw ............................. 146/60
2,022,151  11/1935  Riddle .................................... 146/177

FOREIGN PATENTS OR APPLICATIONS 1,025,116  2/1958  Germany ................................ 146/60

Primary Examiner—Willie G. Abercrombie
Attorney—Robert E. Burns and Emmanuel J. Lobato

[57] ABSTRACT

A device for grating cheese and the like is described. The device consists of a cylindrical housing containing a grating plate. Inserted into the housing above the grating plate is a rotatable cylindrical body divided by a vertical partition which serves to turn the substance to be grated in contact with the plate. A pusher element inserted in the cylindrical body drives the partition by means of slots into which the partition is engaged.

6 Claims, 1 Drawing Figure

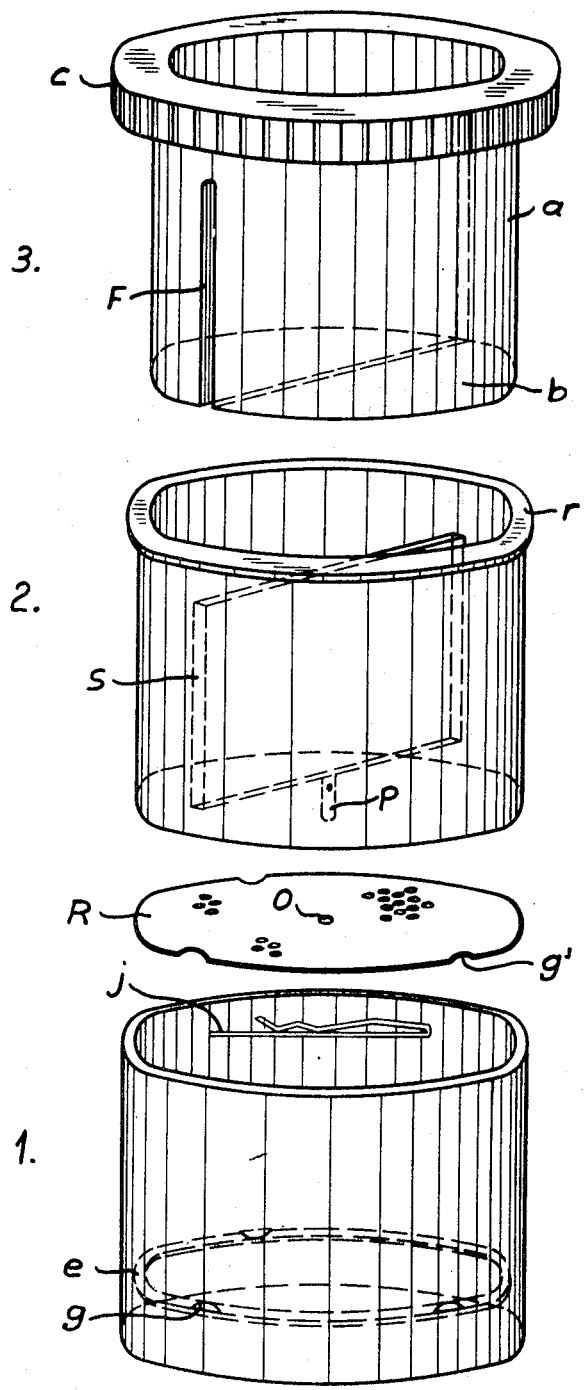

CHEESE-GRATING DEVICE

This invention relates to grating devices, particularly for grating cheeses and the like.

Cheese graters for household use known heretofore have either been designed for rubbing cheese by hand or else have been of a rotary type operated by a crank handle.

These devices however are bulky and nonesthetic in appearance and are hardly suitable for use by guests at a table, in the same way as pepper or salt mills.

It is an object of this invention to provide a grating device particularly suitable for cheeses, but also applicable for other substances, that is simple and reliable and fast, clean and hygienic, easy to fill and to clean, while being of pleasing and even decorative appearance.

The device according to the invention includes a grating plate preferably of stainless steel, and the following three elements made of synthetic materials: first, a cylindrical housing; second, a cylinder divided by a diametrical driver partition, the function of which is to compel the product to rotate while it is in contact with the grater; third, a pusher element provided with a gripper means, whereby the rotational movement imparted to it by hand is transmitted to the driver partition.

A threaded rod may be added to the device for gradually bringing the pushing element closer toward the grating plate.

For a better understanding of the invention reference will now be made to the following description given by way of example and the accompanying drawing in which the device is shown in disassembled condition.

As can be seen from the drawing, the housing 1 is a cylindrical body having on its inner surface a circular shoulder $e$ adapted to receive a grating plate R. The shoulder $e$ is provided with inwardly projecting stops $g$ which cooperate with recesses $g'$ on the plate R to prevent it from rotating.

The driver element 2 consists of a cylindrical envelope having at its upper end an outwardly projecting circular edge $r$ adapted to bear upon the upper edge of case 1, and a diametrically disposed vertical partition S. The partition is provided with a pivot $p$ adapted to cooperate with an aperture $o$ located in the center of plate R.

The pivot has a lateral hole through which extends a pin $j$, the function of which is to support the plate R and to scan its lower surface, when the driver 2 is rotated.

The pusher element 3 has the form of a cylinder having its bottom closed by a wall $d$ and terminating at the top by a knurled crown or knob $c$.

A vertical slot F provided in the sidewall of the pusher element rotationally engages the partition S.

When assembled for use, the driver element 2 and grating plate R retained by pin $j$ are disposed within the housing 1. The grating plate is allowed to rest on the shoulder $e$ and is prevented from rotating by stops $g$ cooperating with recesses $g'$.

The substance to be grated is introduced into the driver element 2 and pressure is applied to the pusher element 3 to bring said substance into contact with the grating plate R.

The pusher element is then rotated by turning the knob $c$ whereby the substance to be grated is caused to rotate, while being maintained in contact with the grating plate.

During this rotational movement the pin $j$ scrapes the grated substance off the lower side of the plate R.

The device is simple, reliable and fast-operating. It is easy to fill and to clean and has a pleasing appearance.

The invention is in no way limited to the embodiment described and shown in the drawing. As an example, instead of having a median partition the driver element may be formed with fins or tubes secured to its cylindrical envelope. Furthermore, a threaded rod may be mounted in the center of the grating plate whereby the pusher element may be brought progressively closer to the plate.

I claim:

1. A device for grating cheese and the like comprising a first cylindrical body forming a housing, a grating plate disposed therein, a second cylindrical body open at both ends and coaxially inserted into said housing, said second body acting as a driver element and overlying said grating plate, transverse partition means connected within said second body for turning the substance to be grated in contact with said grating plate, and a pusher element coaxially received downwardly and into said second body and having means for engaging said partition means for rotating said second body upon rotational movement imparted to said pusher element.

2. A device according to claim 1, wherein said partition means is a vertical blade connected to an inner wall of said second cylindrical body and in which said pusher element has vertically disposed slot means for receiving said vertical blade therein upon downward movement of said pusher element within said second cylinder.

3. A device according to claim 1, wherein said partition means consists of one or more fins connected to an inner wall of said second cylindrical body, and in which said pusher element comprises slot means for receiving said one or more fins upon downward movement of said pusher element within said second chamber.

4. A grating device comprising a grating plate, a first cylindrical member having said grating plate mounted transversely therewithin, means for fixing said grating plate against rotation with respect to said first cylinder, a second cylindrical member open at both ends and slideably received within said first cylindrical member for rotation therewith, means for supporting said second cylindrical member above said grating plate, partition means connected to the inner surface of said second cylindrical member for rotation therewith and for receiving a substance to be grated therebetween, and a pusher element having a lower circular transverse plate received downwardly and coaxially in said second cylindrical member for bearing against the substance to be grated, said transverse plate having slot means therein for receiving said partition means upon axial downward movement of said pusher element within said second cylindrical member, wherein said second cylindrical member and partition means rotate upon rotational movement imparted to said pusher element.

5. A grating device as set forth in claim 4 in which said partition means comprises a vertically disposed blade connected diametrically at its side edges to the inner surface of said second cylindrical member, and further comprising a depending shaft fixedly connected at the center of the lower edge of said blade, said grating plate having a central opening therein for receiving said shaft therethrough, said shaft having a transverse aperture therein, and a pin removably received through said shaft aperture for engaging the underside of said grating plate to scrape the underside of said grating plate upon rotation of said second cylindrical member and vertical blade.

6. A grating device as set forth in claim 4, in which said first cylindrical member has an inwardly projecting circumferential flange connected to its inner surface at a lower portion thereof for supporting said grating plate, and in which said means for fixing said grating plate against rotational movement with respect to said first cylindrical member comprises a plurality of upward projections on said circumferential flange, and a corresponding plurality of peripheral notches in said grating plate for receiving said projections therein.

* * * * *